United States Patent [19]

Sugano et al.

[11] Patent Number: 5,070,367
[45] Date of Patent: Dec. 3, 1991

[54] COLOR IMAGE FORMING APPARATUS WITH AN AUTOMATIC COLOR SELECTION MODE

[75] Inventors: Masahi Sugano; Takashi Murahashi; Hiroyuki Maruyama; Jun Yokobori, all of Hachioji, Japan

[73] Assignee: Konica Corporation, Tokyo, Japan

[21] Appl. No.: 645,098

[22] Filed: Jan. 24, 1991

[30] Foreign Application Priority Data

Feb. 5, 1990 [JP] Japan .................................. 2-25667

[51] Int. Cl.$^5$ ............................................. G03G 15/01
[52] U.S. Cl. .................................... 355/326; 346/157; 355/327
[58] Field of Search ............... 355/326, 327, 202, 203, 355/204; 346/157; 430/42–44; 118/645; 358/75, 8 D

[56] References Cited

U.S. PATENT DOCUMENTS

| 4,690,543 | 9/1987 | Watanabe | 355/326 |
| 4,711,553 | 12/1987 | Watanabe | 355/326 X |
| 4,803,516 | 2/1988 | Watanabe et al. | 355/326 X |
| 4,970,562 | 11/1990 | Birnbaum et al. | 355/327 |

Primary Examiner—A. T. Grimley
Assistant Examiner—William J. Royer
Attorney, Agent, or Firm—Frishauf, Holtz, Goodman & Woodward

[57] ABSTRACT

A color image forming apparatus includes an image reading section which reads an image by scanning it and separating the colors of the image into a plurality of colors; and image processing section which processes the output of the image reading section and outputs the image information of these colors; a recording section which forms an image of these colors in the image region of a photoreceptor according to the image information and transfers the image onto a recording paper; an operating section which sets the copy conditions and controls the above-described sections, wherein the image forming apparatus can copy the document image according to an automatic color selection mode in which the color conditions of the document image is judged, and a color to be used and a copy process in accordance with the color to be used can be automatically determined. When the color image forming apparatus described above is in the automatic color selection mode, the first scanning is conducted for one of these colors described above and the necessity of image forming of other colors is judged during the first scanning.

2 Claims, 7 Drawing Sheets

COLOR IMAGE FORMING APPARATUS WITH AN AUTOMATIC COLOR SELECTION MODE

BACKGROUND OF THE INVENTION

The present invention relates to a color image forming apparatus which can copy images of a plurality of colors, for example an electrostatic color copier.

An electrostatic copier which can copy images of red, blue and black, the maximum number of colors being three, is widely known.

In this type of color copier, an image of three colors can be copied as follows: a photoreceptor drum is rotated three times, and the primary scanning is conducted three times by an image reading section so that three color images can be formed in the image region on the drum surface, wherein an image of one color is registered on an image of another color. In the way described above, one copying operation is completed when the photoreceptor drum has been rotated three times, and primary scanning has been conducted three times. Specifically, a red image is formed in an image region on the photoreceptor drum surface by the first primary scanning (a scanning for red) which is conducted during the first rotation of the photoreceptor drum; a blue image is formed and registered on the red image formed previously in the image region by the second primary scanning (a scanning for blue) which is conducted during the second rotation of the photoreceptor drum; and a black image is formed and registered on the image formed previously in the image region by the third primary scanning (a scanning for black) which is conducted during the third rotation of the photoreceptor drum. The registered images of three colors are transferred onto a sheet of transfer paper. In the same manner described above, when an image of two colors is copied, one copying operation is completed when the photoreceptor drum has been rotated twice, and primary scanning has been conducted twice. When a monocolor image is copied, one copying operation is completed when the photoreceptor drum has been rotated once, and primary scanning has been conducted once.

In this kind of copier, a copier provided with an automatic color selection mode is widely known, in which pre-scanning is conducted before the primary scanning in order to judge the conditions of document colors so that the color to be used and the copy process to be conducted can be automatically determined.

When a copy operation according to the automatic color selection mode is conducted by this copier, in the case of a document of three colors, primary scanning is conducted three times after one pre-scanning. Namely, one copy operation is completed when the document image has been scanned four times. In the case of a document of two colors, primary scanning is conducted twice after one pre-scanning so that one copy operation is completed when a document image has been scanned three times. In the case of a monocolor document, one primary scanning is conducted after one pre-scanning so that one copy operation is completed when a document image has been scanned twice.

As explained above, in the case of a conventional color image forming apparatus performing the automatic color selection mode, pre-scanning is necessarily conducted once before the primary scanning. Accordingly, the time necessary for the prescanning is needed in addition to the time necessary for the primary scanning.

SUMMARY OF THE INVENTION

In order to solve the problems described above, it is a primary object of the present invention to provide a color image forming apparatus which is characterized in that: even in the case of the automatic color selection mode, there is almost no possibility that the time necessary for copy operation is prolonged.

The color image forming apparatus of the present invention comprises: an image reading section which reads an image by scanning it and separating the colors of the image into a plurality of colors; an image processing section which processes the output of the image reading section and outputs the image information of these colors; a recording section which forms an image of these colors in the image region of a photoreceptor according to the image information and transfers the image onto a recording paper; an operating section which sets the copy conditions; and a control section which controls the above-described sections, wherein the image forming apparatus can copy the document image according to an automatic color selection mode in which the color conditions of the document image is judged, and a color to be used and a copy process in accordance with the color to be used can be automatically determined. The color image forming apparatus described above is characterized in that: in the automatic color selection mode, the first scanning is conducted for one of these colors described above; and the necessity of image forming of other colors is judged during the first scanning. Scanning of black is preferably conducted first.

With regard to the detail of the automatic selection mode, the technology disclosed in Japanese Patent Publication Open to Public Inspection Nos. 163970/1984, 157076/1986 or 107274/1988, for example, is applied.

When copy operation is performed in accordance with the automatic color selection mode, the first scanning is conducted for one of these colors. The necessity of image forming of other colors is judged during the first scanning. When the color used for the first scanning is included in the document image, the primary scanning and the pre-scanning which has been conventionally conducted can be performed together, so that the copy time can be reduced since there is no need to spare time for the pre-scanning.

The colors of most documents applied to an electrostatic color copier consist of only black or consist of black and other colors. Accordingly, when the first scanning is conducted for black, the primary scanning for black and the pre-scanning which has been conducted independently can be performed all together, so that the time necessary to conduct the pre-scanning can be eliminated. Consequently, the copy time can be reduced as compared with a conventional electrostatic color copier.

DESCRIPTION OF THE PREFERRED EMBODIMENT

Referring now to the drawings, an example of an electrostatic copier to which the present invention is applied will be explained as follows.

Figure 1:
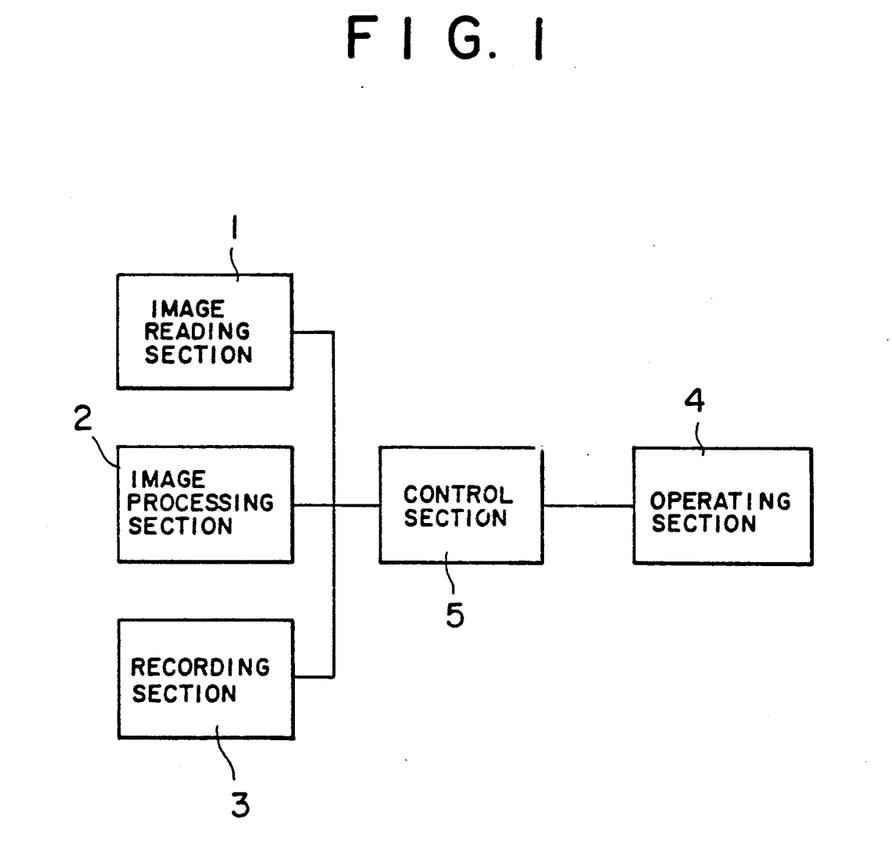
FIG. 1 is a schematic block diagram showing an example of the electrostatic copies of the present invention.
Figure 2:
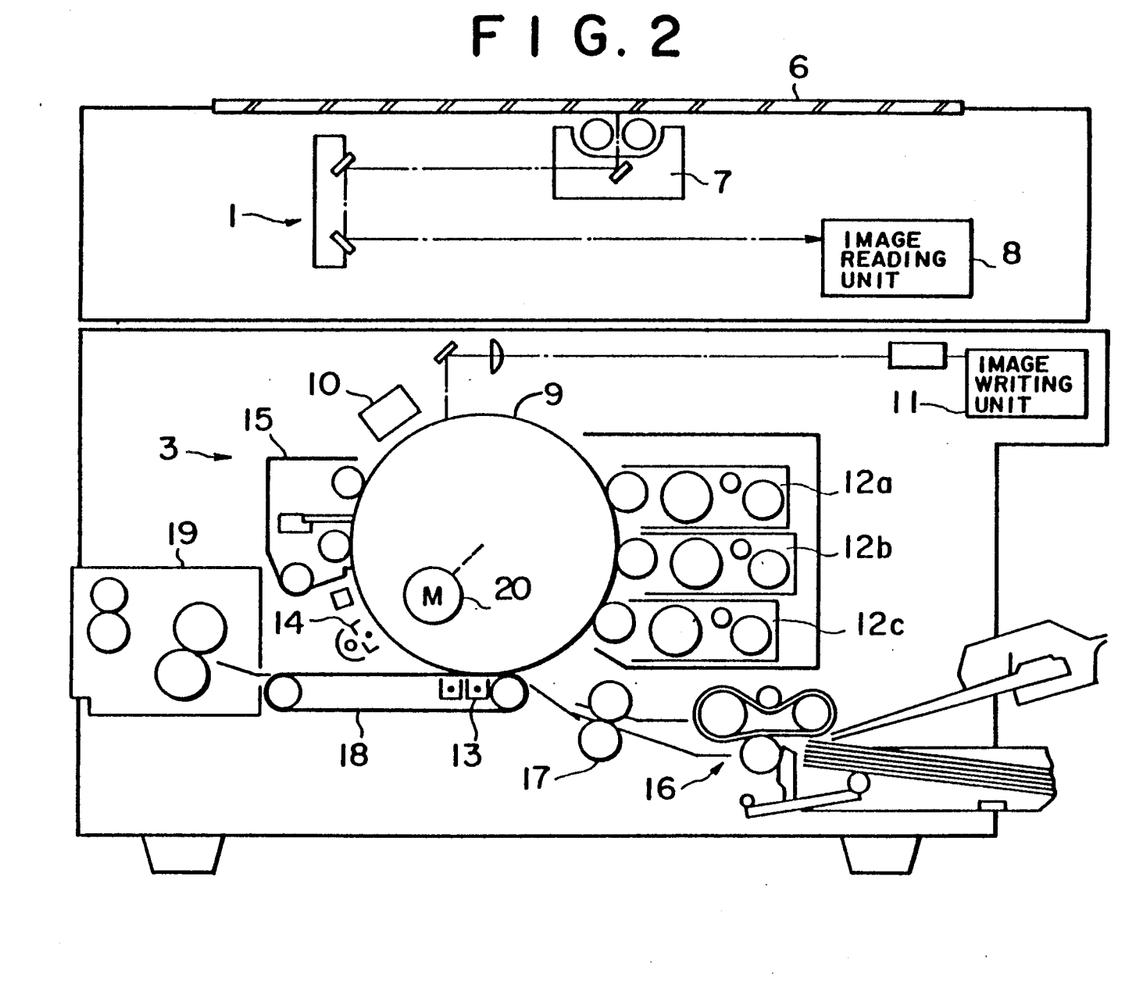
FIG. 2 is a vertical sectional view of the electrostatic copier of the present invention.

FIG. 1 is a schematic block diagram of a color copier, and FIG. 2 is a schematic illustration of the main portion of the color copier.

The copier consists of the image reading section (1), the image processing section (2), the recording section (3), the operating section (4) and the control section (5).

The image reading section (1) scans a document which has been set on the platen (6), separates the colors into three and converts them into electrical signals. The image reading section (1) is provided with the scanner (7), the image reading unit (8) and the like. The image reading unit (8) includes a dichroic mirror as a color separation means, a CCD image sensor which is used as a photoelectric conversion means, an AD converter, a color distinguishing means and color counters of three colors.

The image processing section (2) processes the output of the image reading unit (8) and sends the obtained image information to the control section (5).

The recording section (3) is provided with a photoreceptor drum (9) on which images are formed. An image region of a specific size, which is not illustrated in the drawing, is provided on the surface of the photoreceptor drum (9) surface. Surrounding the drum (9) surface are provided the charger (10), the laser type writing unit (11), three developing units (12a, 12b, 12c), the transfer unit (13), the discharger (14), the cleaning unit (15), the second paper feed roller (the registration roller) (17) of the paper feed unit (16), the separation belt (18) and the fixing unit (19). The drum (9) and the separation belt (18) are driven by the main motor (a DC motor) (20). A laser diode and a laser drive circuit are included in the writing unit (11). The developing units are represented by the numeral (12a, 12b, 12c), and when necessary, they will be referred to as the first developing unit (12a), the second developing unit (12b) and the third developing unit (12c). The first developing unit (12a) is loaded with red developer; the second developing unit (12b) is loaded with blue developer; and the third developing unit (12c) is loaded with black developer.

Figure 3:
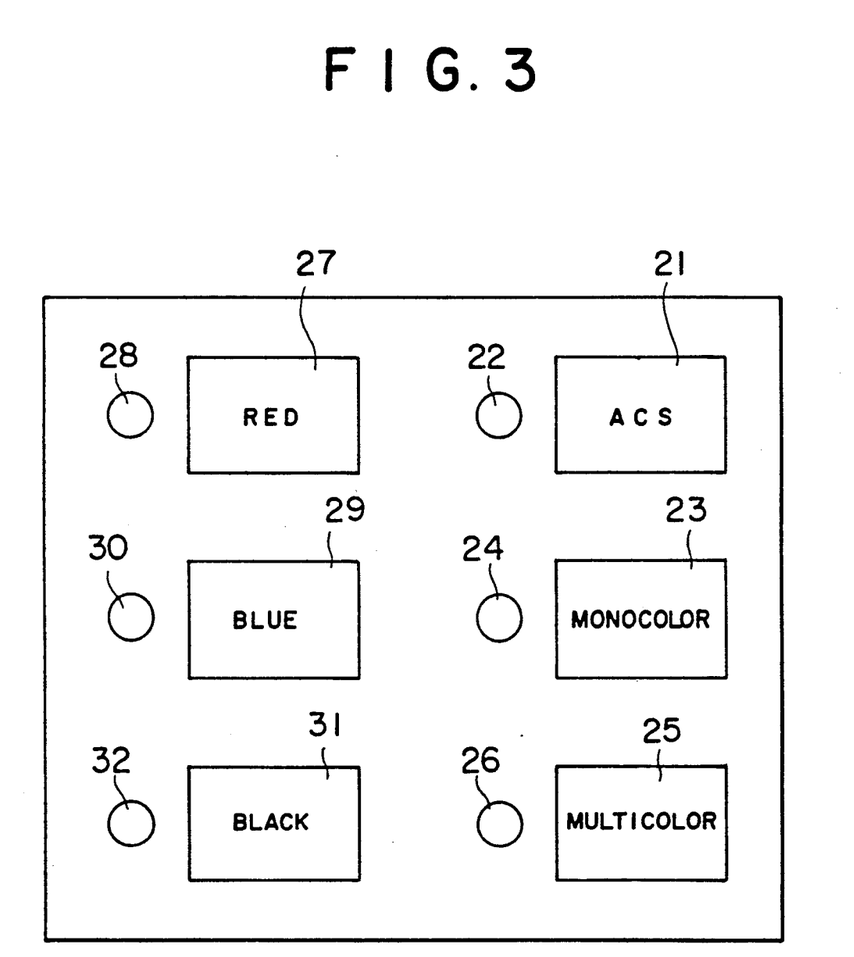
FIG. 3 is a plan view showing a portion of the operating section.

An operator operates the operating section (4) in order to set the copy conditions, a portion of which is shown in FIG. 3. The operating section (4) is provided with a copy switch not illustrated in the drawing, the automatic color selection mode (ACS mode) switch (21) and its indicating lamp (22), the monocolor mode switch (23) and its indicating lamp (24), the multicolor mode switch (25) and its indicating lamp (26), the red switch (27) and its indicating lamp (28), the blue switch (29) and its indicating lamp (30), and the black switch (31) and its indicating lamp (32).

The control section (5) having a microcomputer controls each portion of the copier.

When a document on the platen (6) is scanned by the scanner (7), the color of each point on the document is separated into red, blue and black and read by the reading unit (8), and the frequency of each color is counted by each color counter, so that the frequency of each color can be known through each color counter.

A monocolor copy in which either of red, blue and black is used, and a multicolor copy in which either two of red, blue and black or three colors are used, can be conducted in the copier described above. In the case of a monocolor copy, a document is scanned by the scanner (7) and its image is written in the image region on the surface of the photoreceptor drum (9) and developed by either of the developing units (12a, 12b, 12c). In the way described above, image forming is completed by scanning, writing and developing, and the developed image is transferred onto a transfer paper which has been supplied by the second paper feed roller (17) of the paper feed unit (16).

In the case of a multicolor copy, an image is formed when the photoreceptor drum (9) is rotated twice or three times. Specifically, in the case of a three color copy, a red image is formed in the image region by the scanner (7), the writing unit (11) and the first developing unit (12a) at the first revolution of the photoreceptor drum (9); a blue image is formed in the image region by the scanner (7), the writing unit (11) and the second developing unit (12b) at the second revolution of the drum (9), wherein the blue image is registered on the previously formed red image; and a black image is formed by the scanner (7), the writing unit (11) and the third developing unit (12c) at the third revolution of the drum (9), wherein the black image is registered on the previously formed red and blue images. In the case of a two color copy, image forming of one of red, blue and black is not necessary, so that image forming can be completed when the photoreceptor drum (9) has been rotated twice. In the case of a three color copy, a transfer paper is supplied by the second paper feed roller (17) at the third revolution and in the case of a two color copy a transfer paper is supplied at the second revolution. Then, the multicolor image formed in the manner explained above is transferred onto the transfer paper.

In the copier described above, document images can be copied according to an ACS mode in which the color to be used is automatically selected by judging the conditions of document colors.

The copier can be set to the ACS mode by turning on the ACS mode switch (21).

When a document image is copied according to the ACS mode, scanning is performed in order to form a black image first, and it is judged first whether red and blue exist in the image or not. When it has been judged that the document image consists of only black, the process of image forming is completed, and the black image formed in an image forming region is transferred onto a transfer paper. In the way described above, the copy operation is completed. When red or blue is included in the document image, scanning is conducted for that color, and the image subsequently formed in the image region is transferred onto a transfer paper.

Referring now to the flow chart shown in FIGS. 4A-4D, the operation of a copier in the case of the ACS mode will be explained.

Figure 4A:
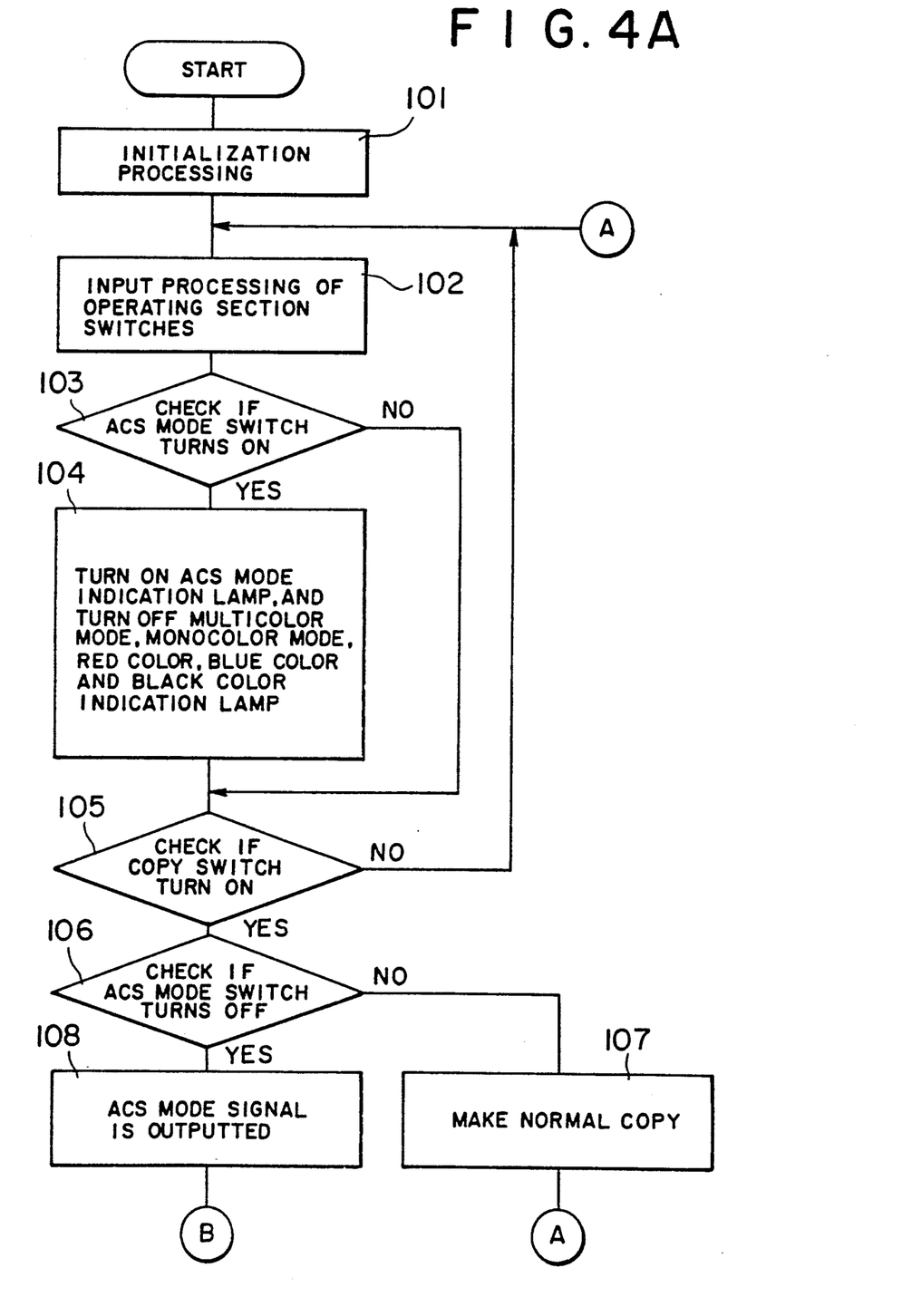
FIGS. 4A-4D are flow charts showing the working action of the electrostatic cop operated according to the automatic color selection mode.

In FIG. 4A, when electric power is supplied to the apparatus, the necessary initialization processing is conducted in step 101; and input processing of operating section switches is performed in step 102. Whether the ACS mode switch (21) is turned on or not is checked in step 103. When it is turned on, the ACS mode indicating lamp (22) is turned on in step 104, and the multicolor indicating lamp (26), the monocolor mode indicating lamp (24), the red indicating lamp (28) and the blue indicating lamp (30) are turned off so that the process is advanced to step 105. When the ACS mode switch (21) is turned off in step 103, the process is advanced to step 105 as it is. In step 105, whether the copy switch is turned on or not is checked, and the process is returned to step 102 in order to repeat the above-described operation until the copy switch is turned on.

When the copy switch is turned on, the ACS mode switch (21) is checked in step 106. When the ACS mode switch (21) is turned off, the process is advanced to step 107 so that the ordinary copy operation can be conducted, and then the process is returned to step 102.

When the ACS mode switch (21) is turned on in step 106, the copy operation of ACS mode is performed in accordance with step 108 and other steps.

In step 108, an ACS mode signal is outputted into the image processing section (2) so that the image processing section (2) can process signals in accordance with the ACS mode.

Figure 4B:
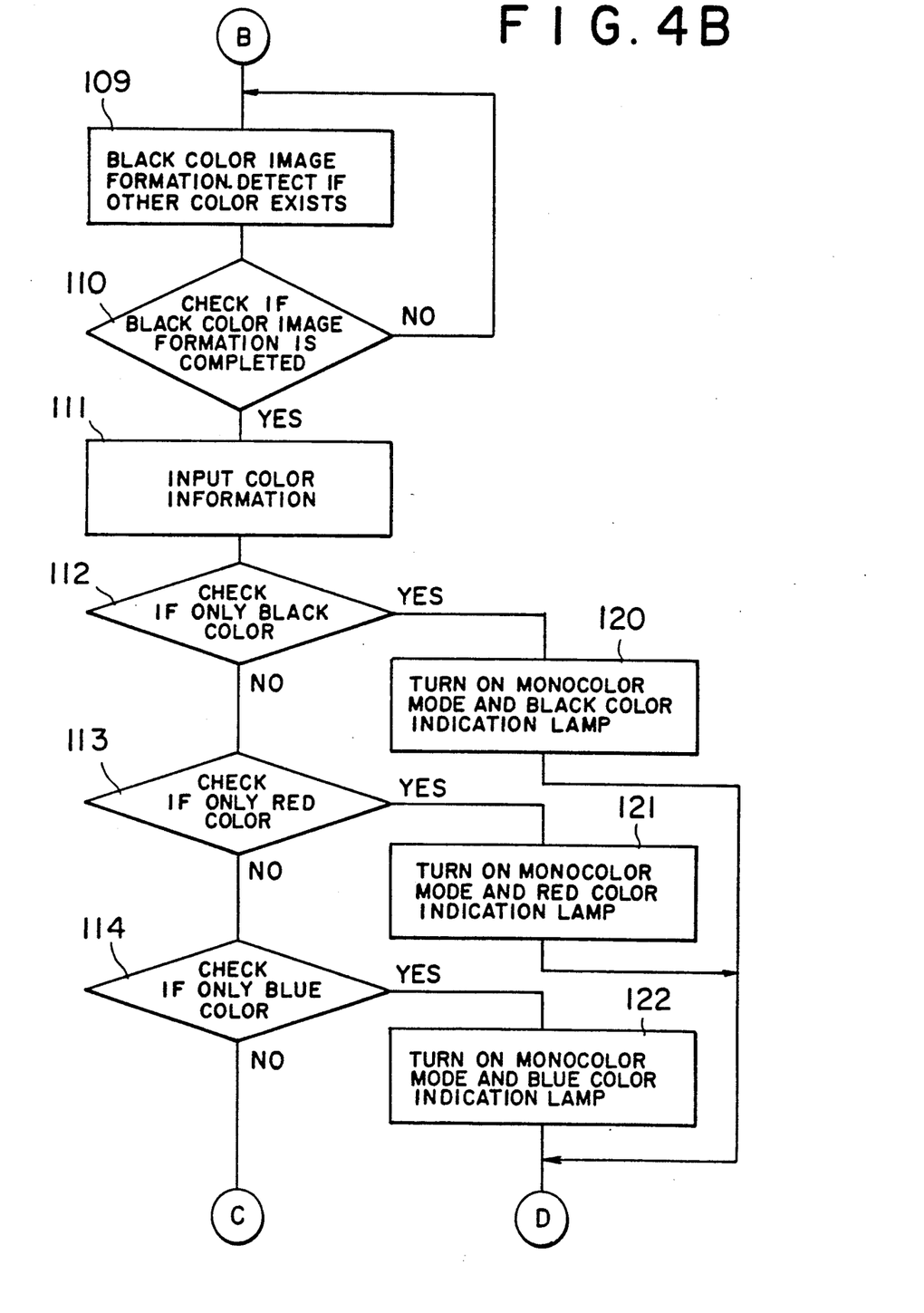

Next, a black image is formed in step 109 and whether red and blue exist in the document image or not is checked during the black image forming in such a manner that each color counter of the image reading section is checked in the image processing section. Whether black image forming has been completed or not is checked in step 110, and steps 109 and 110 are repeated until the completion of black image forming.

When black image forming has been completed, color information is inputted from the image processing section (2) in step 111. This color information which was obtained during black image forming, indicates whether other colors exist in the document image or not.

Figure 4C:
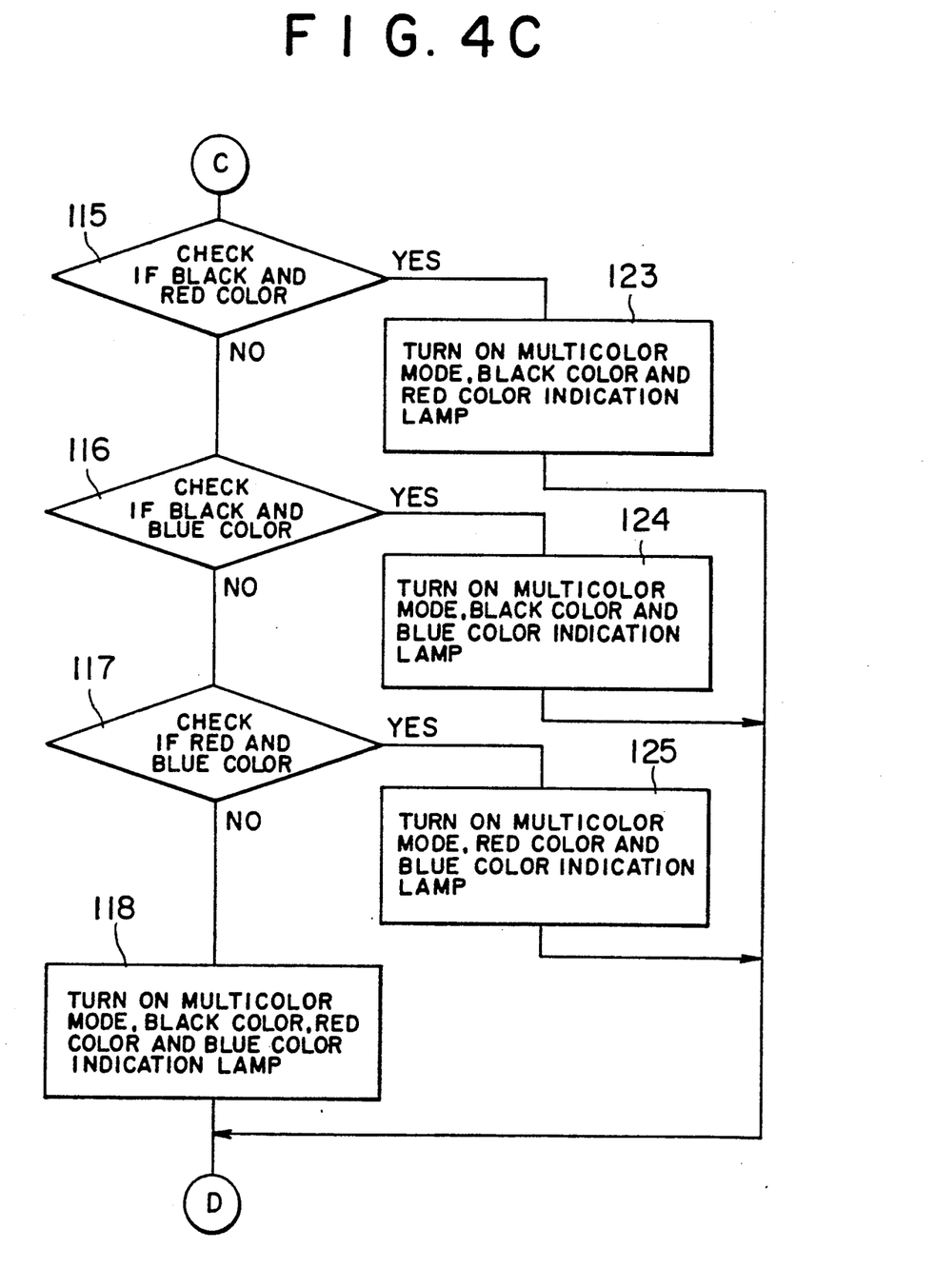

Then, it is checked in step 112 whether the color information consists of only black or not. When the color information includes colors other than black, the process is advanced to step 113. In step 113, it is checked whether the color information consists of only red or not. When the color information includes colors other than red, the process is advanced to step 114. In step 114, it is checked whether the color information consists of only blue or not. When the color information includes colors other than blue, the process is advanced to step 115. In step 115, it is checked whether the color information consists of only black and red, or not. When the color information includes colors other than black and red, the process is advanced to step 116. In step 116, it is checked whether the color information consists of only black and blue, or not. When the color information includes colors other than black and blue, the process is advanced to step 117. In step 117, it is checked whether the color information consists of only red and blue, or not. When the color information includes black, red and blue, the process is advanced to step 118, and the multicolor mode indicating lamp (26), the black indicating lamp (32), the red indicating lamp (28) and the blue indicating lamp (30) are turned on so that the process is advanced to step 119.

When the color information consists of only black in step 112, the monocolor mode indicating lamp (24) and the black indicating lamp (32) are turned on in step 120, then the process is advanced to step 119.

When the color information consists of only red in step 113, the monocolor indicating (24) and red indicating lamp (28) are turned on in step 121, then the process is advanced to step 119.

When the color information consists of only blue in step 114, the monocolor mode indicating lamp (24) and the blue indication lamp (30) are turned on in step 122, then the process is advanced to step 119.

When the color information consists of only black and red in step 115, the multicolor mode indicating lamp (26), the black indicating lamp (32) and red indicating lamp (28) are turned on in step 123, then the process is advanced to step 119.

When the color information consists of only black and blue in step 116, the multicolor mode indicating lamp (26), the black indicating lamp (32) and the blue indicating lamp (30) are turned on in step 124, then the process is advanced to step 119.

When the color information consists of only red and blue in step 117, the multicolor mode indicating lamp (26), the red indicating lamp (28) and the blue indicating lamp (30) are turned on, then the process is advanced to step 119.

Figure 4D:
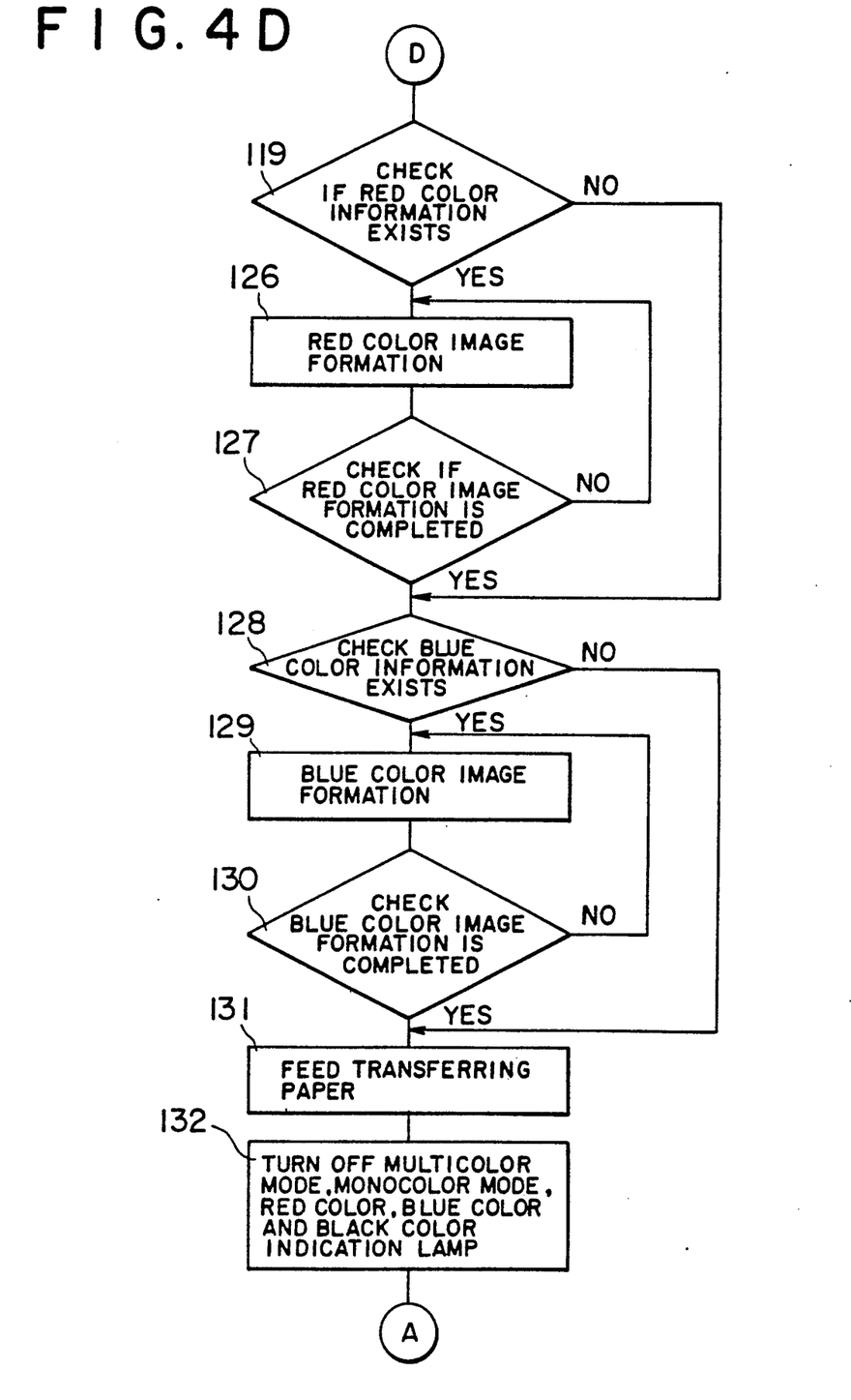

In step 119, it is checked whether the color information includes red or not. When it includes red, the process is advanced to step 126 and the red images are formed. In step 127, it is checked whether red image has been completed or not. Steps 126 and 127 are repeated until red image forming is completed, and when red image forming has been completed, the process is advanced to step 119. When the color image information does not include red in step 119, the process is advanced to step 128.

In step 128, it is checked whether the color information includes blue or not. When the color information includes blue, the process is advanced to step 129 and blue image forming is performed. In step 130, it is checked whether blue image forming has been completed or not. Steps 129 and 130 are repeated until blue image forming is completed. When blue image forming has been completed, the process is advanced to step 131. When the color information does not include blue in step 128, the process is advanced to step 131 as it is.

In step 131, a transfer paper is fed and the image formed on the photoreceptor drum (9) is transferred onto the transfer paper. After copying has been completed, in step 132, the multicolor mode indicating lamp (26), the monocolor mode indicating lamp (240, the red indicating lamp (28), the blue indicating lamp (30) and the black indicating lamp (32) are turned off, and the process is returned to step 102.

In the case of a document including only black, the color information of black is made when black images are formed in steps 109 and 110. Accordingly, steps 112 and 120 are executed, and the process is advanced to step 119. Since the color information includes neither red nor blue, red image forming and blue image forming are not performed and only black images are transferred onto a transfer paper in step 131. In other words, the copying operation is completed by conducting only one scanning to form black images.

In the case of a black and red document, the black and red information is made when black images are formed. Therefore, steps 115 and 123 are executed and the process is advanced to step 119. Since the color information includes red, red images are formed in steps 126 and 127. However, as the color information does not include blue, blue images are not formed, and only black and red images are formed and transferred onto a transfer paper. Copy operation is completed by scanning a document image twice.

In the same way, in the case of a document image including only black and blue, the copying operation is completed by scanning twice to form black and blue images.

In the case of a document image of black, red and blue, the color information of black, red and blue is made when a black image is formed. Therefore, the process is advanced from step 117 to step 119 through step 118. Since the color information comprises red and blue, red and blue images are formed, and images of black, red and blue are transferred onto a transfer paper. Specifically, scanning is conducted three times in order to form the images of black, red and blue.

The colors of most documents applied to an electrostatic color copier consist of only black or consist of black and other colors. Accordingly, when the first scanning is conducted for black, the primary scanning for black and the pre-scanning which has been conducted independently can be performed all together, so that the time necessary to conduct the pre-scanning can be eliminated. Consequently, the copy time can be reduced as compared with a conventional electrostatic color copier. However, the color which is used for the first image forming is not necessarily limited to black. Even when the color which is used for the first image forming is not black, the primary which has been conventionally conducted, can be unified, in other words scanning is conducted only once, so that the copy time can be shortened as compared with a conventional color copier.

According to the image forming apparatus of the present invention, when a document image includes the color for which the first image forming is conducted, the primary scanning to form the image of this color and the pre-scanning which has been conventionally conducted, can be unified, so that the time necessary for pre-scanning can be eliminated and the total copy time can be reduced.

When black is selected for the color by which the first image forming is executed, the primary scanning to form a black image and the pre-scanning which has been conventionally conducted can be unified so that the copy time can be reduced.

What is claimed is:

1. A color image forming apparatus having an automatic color selection mode to determine a color to be used and a copy process to be conducted in accordance with the color obtained by distinguishing a color composition of an original document, comprising:
   (a) means for setting the automatic color selection mode;
   (b) an image reading means for reading the original document by scanning and for separating the original document into a plurality of colors, wherein, when the automatic color selection mode is set, a scanning for a predetermined color out of the plurality of colors is carried out to form an image for the predetermined color, and the presence of color other than the predetermined color is detected during the scanning;
   (c) an image processing means for outputting image information of the detected colors; and
   (d) a control means for judging the necessity of forming images for the detected colors based on the image information and for controlling the copy process for the detected colors.

2. The color image forming apparatus of claim 1 wherein the predetermined color is back.

* * * * *